A. W. STEIGER.
TYPE WRITING MACHINE.
APPLICATION FILED JULY 2, 1909.
938,178.
Patented Oct. 26, 1909.
7 SHEETS—SHEET 1.
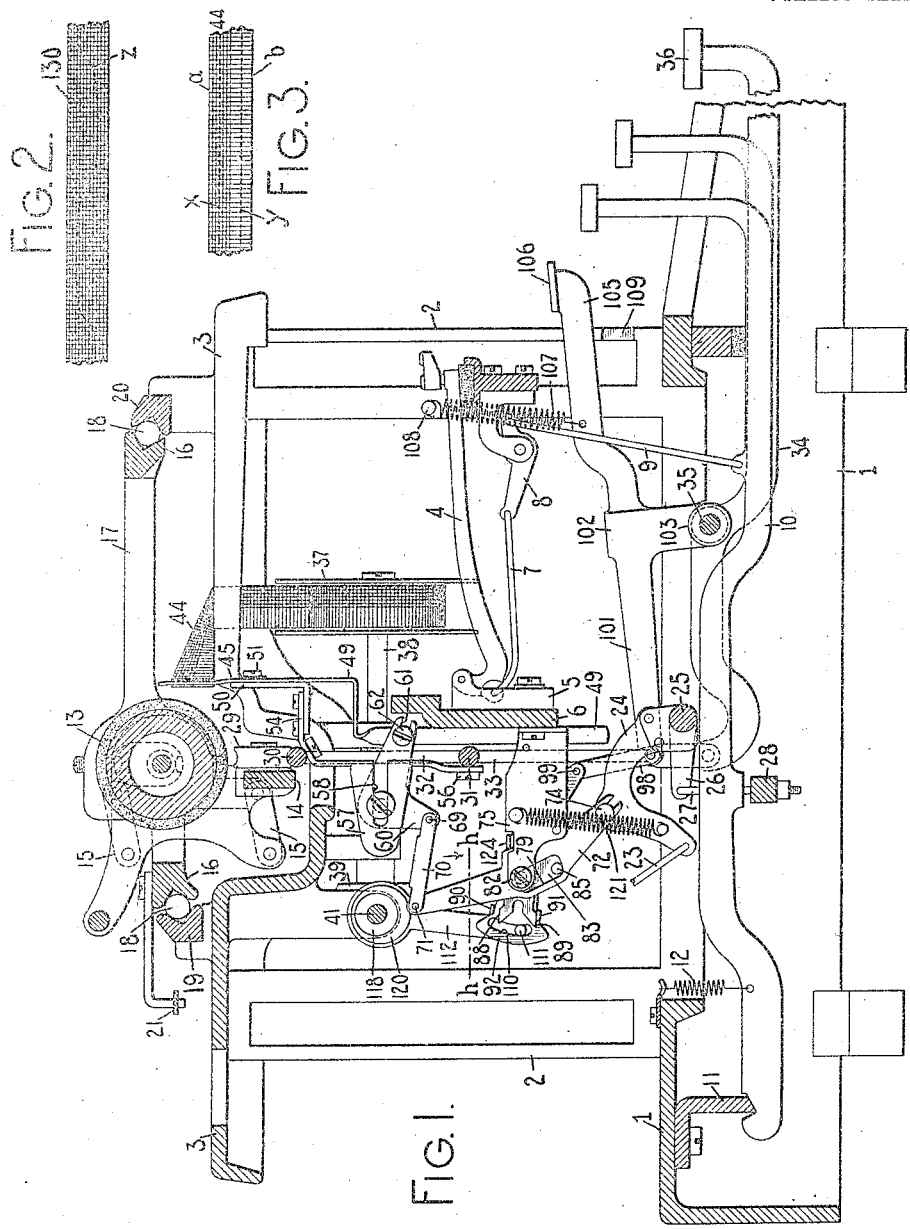
WITNESSES:
J. B. Deeves
M. W. Pool
INVENTOR:
Andrew W. Steiger
By Jacob Felbel
HIS ATTORNEY

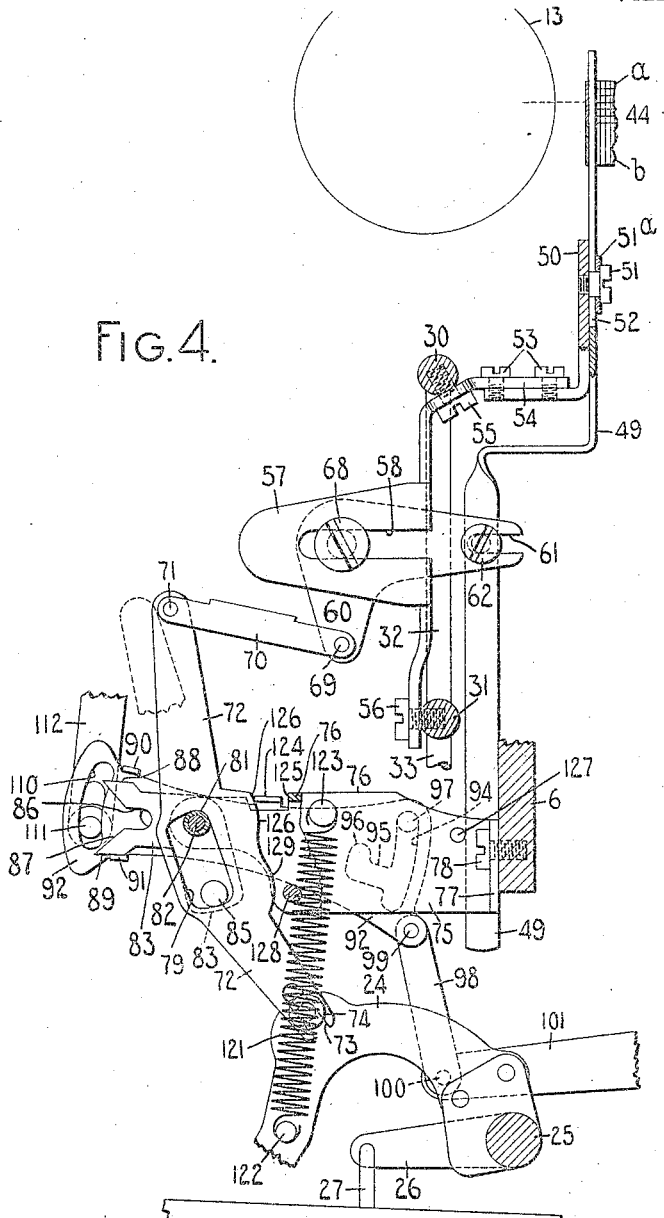

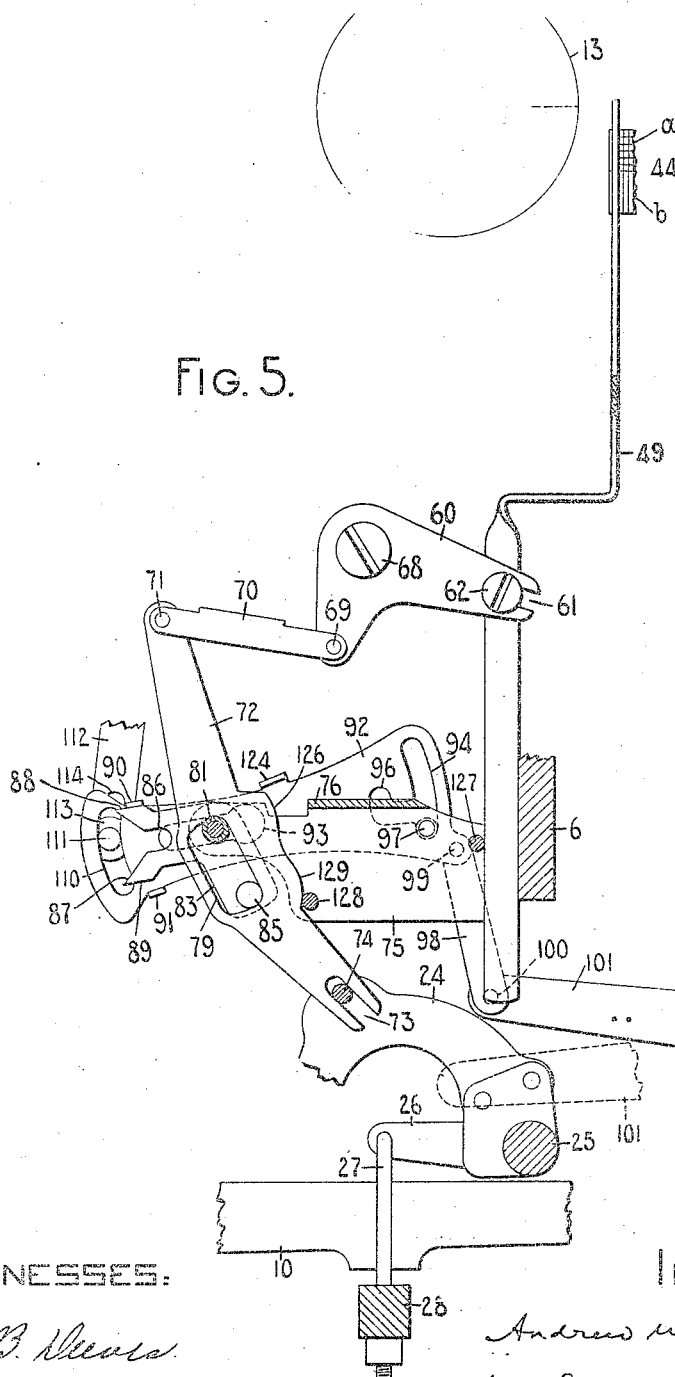

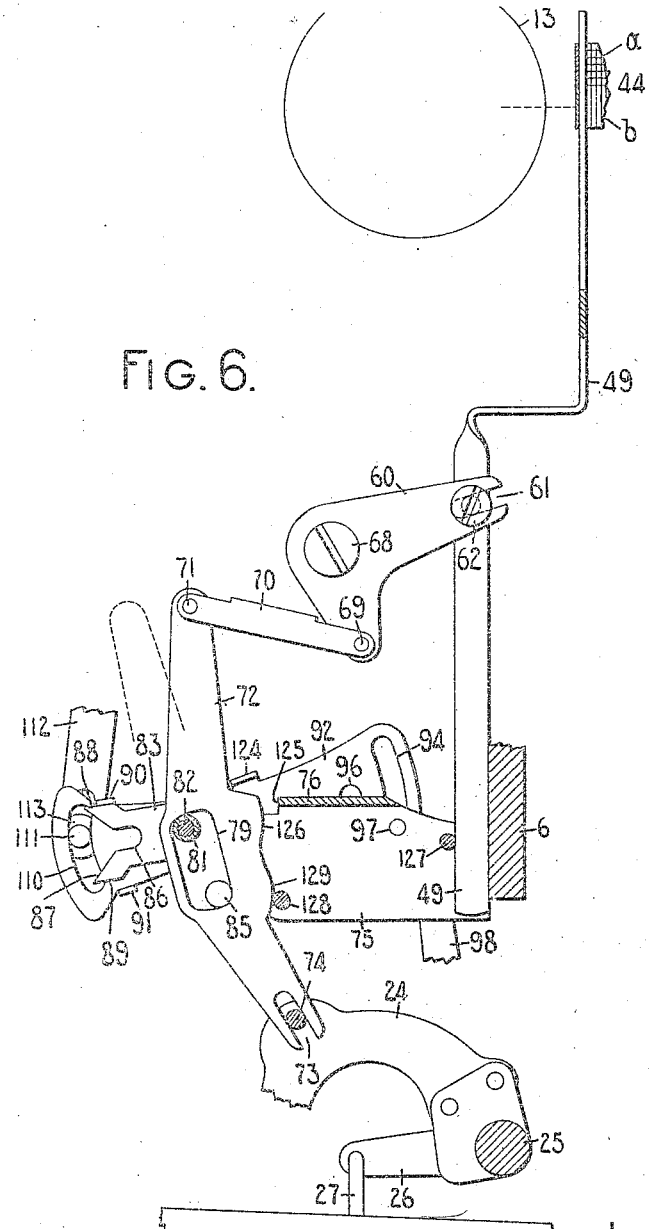

A. W. STEIGER.
TYPE WRITING MACHINE.
APPLICATION FILED JULY 2, 1909.
938,178.
Patented Oct. 26, 1909
7 SHEETS—SHEET 5
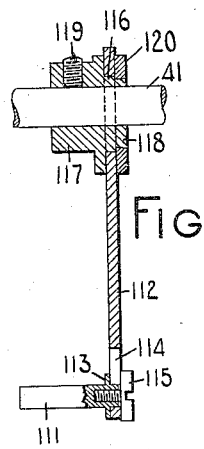
Fig. 9.
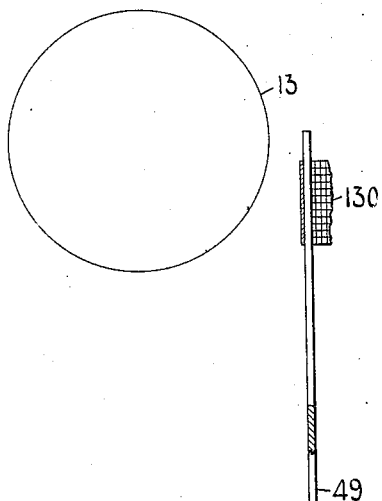
Fig. 7.
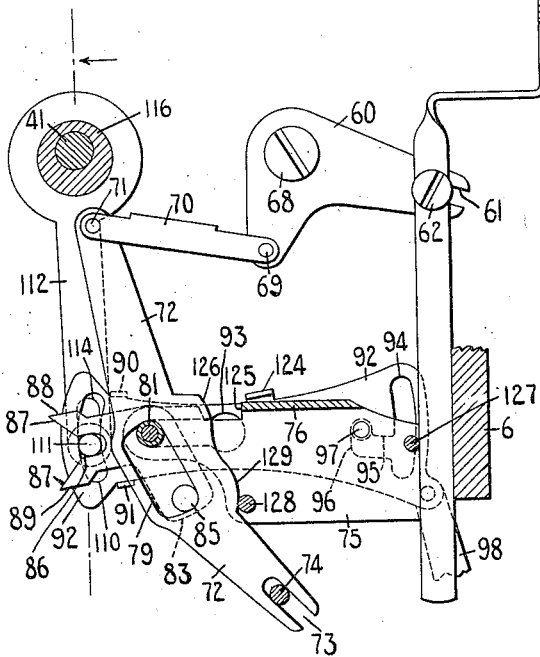
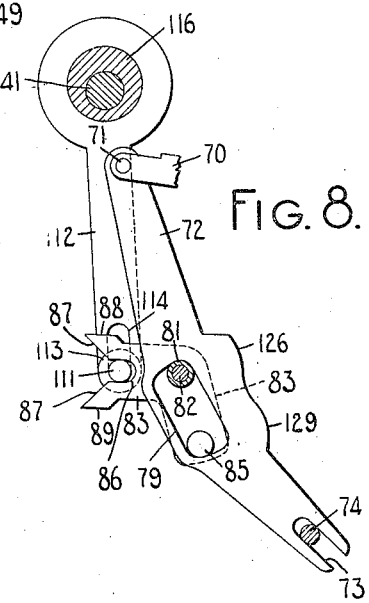
Fig. 8.
WITNESSES:
J. B. Kleeves
M. W. Pool
INVENTOR:
Andrew W. Steiger
By Jacob Felbel
HIS ATTORNEY

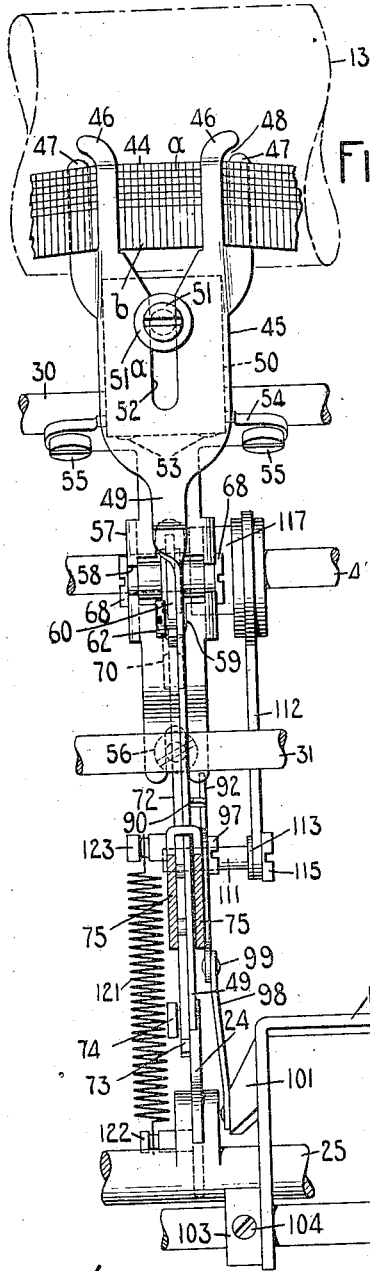

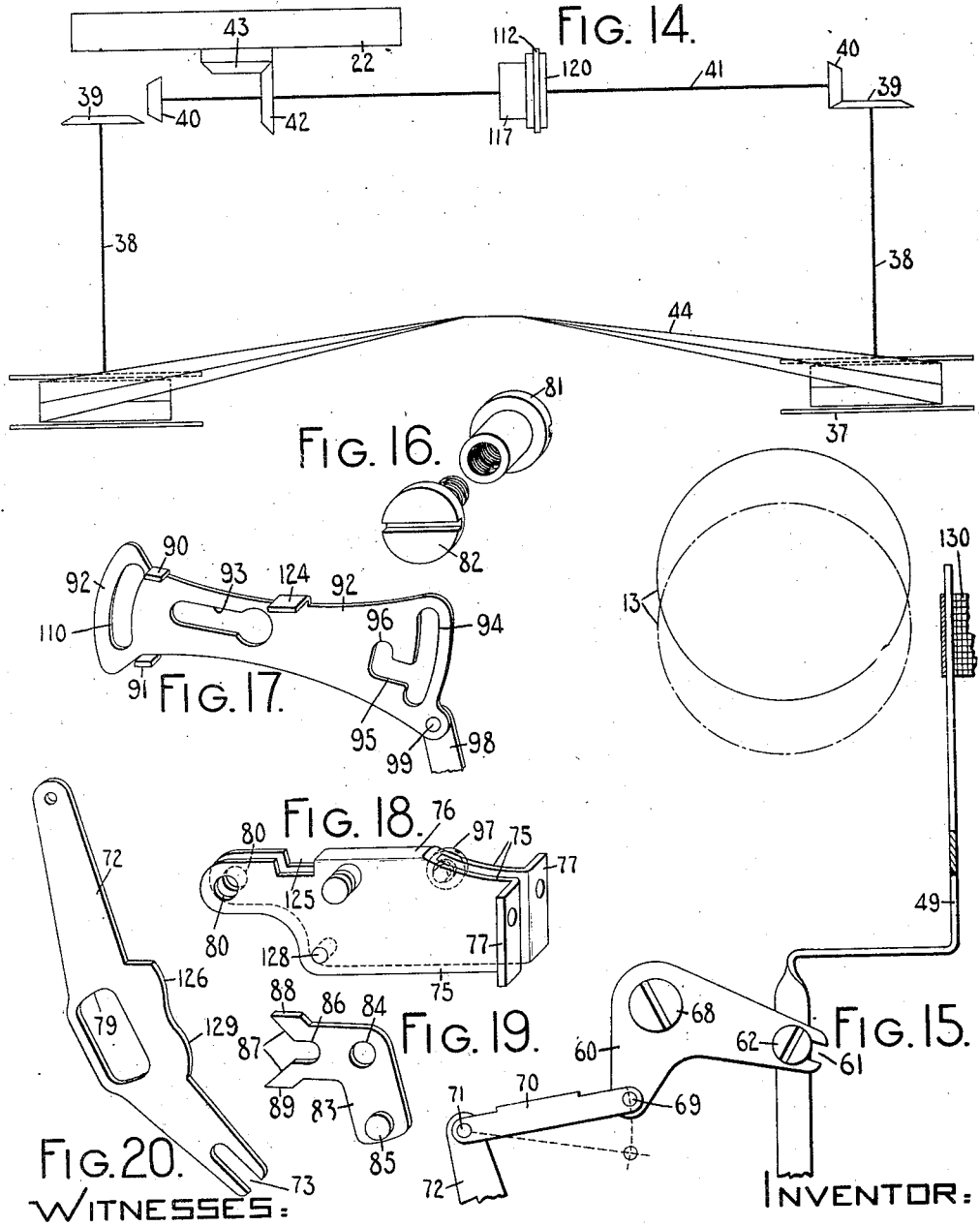

UNITED STATES PATENT OFFICE.

ANDREW W. STEIGER, OF BRIDGEPORT, CONNECTICUT, ASSIGNOR TO UNION TYPEWRITER COMPANY, OF JERSEY CITY, NEW JERSEY, A CORPORATION OF NEW JERSEY.

TYPE-WRITING MACHINE.

938,178.     Specification of Letters Patent.     Patented Oct. 26, 1909.

Application filed July 2, 1909. Serial No. 505,559.

*To all whom it may concern:*

Be it known that I, ANDREW W. STEIGER, a citizen of the United States, and resident of Bridgeport, in the county of Fairfield and State of Connecticut, have invented certain new and useful Improvements in Typewriting Machines, of which the following is a specification.

My invention relates to ribbon mechanism for typewriting machines and its object generally stated is to provide improved devices of the class specified.

More specifically, one object of my invention is to provide improved means for obtaining a cross feed of the ribbon in a machine which employs a vibratory ribbon carrier or vibrator and also in a machine in which the platen is shiftable to change case.

Another object is to dispense with the cross feeding of the ribbon and to write in predetermined selected paths lengthwise of different ribbon fields, this construction providing for the use of a bi-color ribbon or a ribbon having two or more parallel fields of different characteristics or colors.

To the above and other ends my invention consists in the features of construction, combinations of devices and arrangements of parts hereinafter described and particularly pointed out in the claims.

My invention is shown applied to a front-strike typewriting machine provided with a shifting platen, said machine generally resembling the No. 10 Remington typewriter. The nature of the invention is such, however, that it may be adapted to other styles of writing machines and some of the features of said invention may be employed with machines in which the platen does not shift and also in machines other than front-strike typewriting machines.

In carrying out my invention in the present instance the ribbon carrier is mounted on a guide which is carried by and shifts with the platen shifting devices, the ribbon carrier shifting with the platen so that the relationship between the two is not affected by the platen shift. I provide a train of actuating devices for the ribbon carrier or vibrator which train includes a lever termed the operating lever and formed with a slot or opening which receives two fulcrums or pivot pins for said lever. Said operating lever is not affected by the shifting of the platen. One of the fulcrums occupies a fixed position with respect to said lever while the other fulcrum is movable. Means are provided for automatically varying the position of said movable fulcrum so that during the operation of the parts said lever will initially coöperate with its fixed fulcrum but will at different points in its travel engage with and fulcrum on said movable fulcrum. As soon as said lever engages with said movable fulcrum it leaves or disengages from said fixed fulcrum; and as the position of said movable fulcrum automatically varies the result will be that the throw or extent of movement from normal position of the ribbon carrier will be varied. As the ribbon receives the usual longitudinal feeding movements, this variation in the throw will result in the cross feeding or widthwise use of the ribbon, the types following a serpentine path which extends lengthwise of the ribbon and waves or curves from edge to edge thereof.

Means are further provided for disconnecting the movable fulcrum from the devices which automatically control it and for setting said fulcrum in one or another of a plurality of predetermined positions, said fulcrum being maintained in set position as long as may be desired. In the present instance when said movable fulcrum is set in one of these predetermined positions it will not co-act with the operating lever during the operation thereof, said lever pivoting solely on the other or permanently fixed fulcrum, with the result that the throw imparted to the ribbon carrier will not vary and the types will follow a straight path along one of the ribbon fields. When said movable fulcrum is set in another of its predetermined positions, however, the operating lever when actuated will immediately leave or separate from the permanently fixed fulcrum and will throughout substantially its entire actuated movement co-act with the re-set fulcrum. The result will be that the ribbon carrier will again impart to the ribbon an unvarying extent of movement or throw which will, however, vary from the other predetermined throw and will cause the types to follow a straight path extending along another of the ribbon fields and parallel with the first mentioned straight path.

One form of the invention is illustrated in the accompanying drawings wherein—

Figure 1 is a vertical front-to-rear sectional view of a typewriting machine embodying my invention, parts of said machine being omitted and parts broken away. This figure shows the ribbon carrier in normal position and with the automatic cross-feeding devices inoperative and the parts adjusted so that the upper ribbon field will be presented to the types at each printing operation. Fig. 2 is a face view of a portion of a plain or uniform ribbon showing the path followed by the types when the automatic cross-feeding devices are operative. Fig. 3 is a face view of a portion of a two-color ribbon showing the paths followed by the types lengthwise of both ribbon fields. Fig. 4 is an enlarged fragmentary side elevation partly in section showing the operated positions of the ribbon carrier and controlling parts when said parts are adjusted as in Fig. 1 for using the upper ribbon field. Fig. 5 is a view similar to Fig. 4 but showing the normal position of the ribbon vibrator and controlling devices therefor when adjusted to present the lower ribbon field to the types. Fig. 6 is a view corresponding with Fig. 5 but showing the operated position of the parts, the lower field of the ribbon being opposite the printing point on the platen. Fig. 7 is a view similar to Fig. 4 but showing the normal position of the ribbon carrier and controlling parts when the automatic cross feeding devices are operative. Fig. 8 is a view of some of the parts shown in Fig. 7 but with said parts in different relations from those they occupy in Fig. 7. Fig. 9 is a sectional view of part of the automatic cross feeding mechanism for the ribbon. Fig. 10 is an enlarged front elevation partly in section of the ribbon carrier and the controlling devices therefor. Fig. 11 is a horizontal sectional view taken on a plane represented by the dotted line h—h in Fig. 1 and looking in the direction of the arrows at said line. Fig. 12 is a fragmentary edge view of the upper part of the ribbon carrier or vibrator. Fig. 13 is a horizontal sectional view of certain of the ribbon controlling devices. Fig. 14 is a diagrammatic plan view illustrating the mechanism for feeding the ribbon longitudinally. Fig. 15 is a diagrammatic side elevation showing the position occupied by certain of the ribbon carrier controlling devices when the platen is shifted from lower to upper case. Figs. 16 to 20 are detached perspective views of various elements or parts of the ribbon controlling devices.

Referring to Fig. 1, the main frame of the machine comprises a base 1, corner posts 2 and a top plate 3. Type bars, one of which is shown and numbered 4, are each pivoted on a hanger 5 secured to a stationary segment 6. Each type bar is connected by a train of devices comprising a link 7, lever 8 and a second link 9 to a key lever 10 fulcrumed on an angular plate 11 and provided with a restoring spring 12. The type bars when actuated coöperate with the front face of a cylindrical platen 13 mounted on a platen frame or carrier 14 connected by links 15 to a rectangular truck comprising front and rear bars 16 joined by end bars 17. The bars 16 are formed with longitudinal grooves to coöperate with anti-friction balls 18, which balls also coöperate with grooved track-ways 19 and 20 fixedly supported above the top plate 3. A band or strap 21 connects the carriage comprising said truck and said platen frame with a spring drum 22 (Fig. 14) which constantly tends to draw the carriage leftward in printing direction over the top plate. The movements of the carriage in printing direction are controlled by carriage feeding or escapement devices (not shown), certain of said devices being connected by a link 23 with an arm 24 fixed to a rock shaft 25, said rock shaft being pivoted at its ends in the sides of the base 1. Arms 26 extend rearward from the rock shaft near its ends and pivotally support depending arms or lugs 27 which carry a universal bar 28, said universal bar underlying the key levers 10 and being operative thereby.

Pivoted on the platen carrier 14 is a wheel or roller 29 which runs on a shiftable rod 30, said rod being comprised in the platen shifting frame which further includes a rod 31 parallel to the rod 30 and vertical arms 32 connecting said rods, one only of said arms 32 being shown. Arms 33 extend downward from the rod 31, each arm 33 being pivotally connected with a platen shifting lever 34 fulcrumed on a cross rod 35 and terminating at the front of the machine in a shift key 36.

Ribbon spools 37 vertically disposed one at each side of the machine below the top plate (Figs. 1 and 14) are supported on shafts 38, said shafts extending rearward and each carrying a beveled gear wheel 39. Adapted to mesh alternately with said gear wheels are beveled pinions 40 supported on the ends of a driving shaft 41, said shaft being connected by beveled pinions 42 and 43 with the spring drum 22 in such a way that when the spring drum turns to draw the carriage in printing direction it rotates said driving shaft 41, but does not operate on said driving shaft during return movements of the carriage from left to right. The pinion 42 is slidably connected with the shaft 41 in such a way that it transmits a rotary movement to said shaft but permits the shaft to be moved back and forth longitudinally without affecting said pinion 42. The longitudinal movements of said shaft 41 may be caused in any desired manner and operate to connect one or another of the pinions 40 with its coöperating beveled wheel 39 so as to drive alternately the spools 37 and wind or feed the ribbon longitudinally. Wound upon said ribbon spools 37 is a ribbon 44 which ribbon as shown in Figs. 1, 3, 14 and certain of the other views is divided longitudinally into fields $a$ and $b$ of different characteristics or colors. The ribbon extends upward from each spool through openings in the top plate and is directed by suitable guides inward toward the middle of the machine. Midway between the spools the unwound portion of the ribbon is threaded through a vibratory ribbon carrier or vibrator, the details of which are best shown in Figs. 10 and 12. Said ribbon carrier comprises a head 45 provided with pairs of upwardly extending fingers 46 and 47. Between each finger 46 and the adjacent finger 47 is a vertically disposed slot 48 through which the ribbon passes. The types strike the ribbon in the space between the fingers 46.

As shown in Fig. 12 the sides of the head 45 are bent rearward so that the fingers 47 are slightly behind the fingers 46; and the upper ends of said fingers 46 above the tops of the fingers 47 are also bent slightly rearward. The construction is such that the ribbon while it may be readily threaded through the slots will after such threading be retained therein and will not slip out during vibratory movements of the carriage. Depending from the head 45 is a stem 49, said stem as shown in Fig. 1 and other views being provided with a rearward off-set and being twisted so that it extends downward edgewise behind and contiguous to the stationary segment 6. The ribbon carrier is guided by a guiding device which as shown in Figs. 1 and 10 comprises an angular bracket 50 carrying a headed screw 51 and an underlying washer 51ª between which and the front face or vertical portion of said bracket the ribbon carrier is confined and guided, the head of said carrier being formed with a slot 52 which coöperates with the shank of the screw 51. The horizontal portion of the bracket 50 is secured by screws 53 to the horizontal portion of a second angular bracket 54, said bracket 54 being secured by screws 55 to the rod 30. From the rod 30 the bracket 54 is bent downward, terminating behind the rod 31 and being secured thereto by a screw 56. Between the rods 30 and 31 the downwardly extending portion of the bracket 54 is provided with parallel rearwardly extending tabs or ears 57 which are formed with open mouthed slots 58 connected at their front or open ends by a slot 59 formed in the vertical part of the bracket (Figs. 10 and 13). The tabs 57 provide a support for a bell crank lever 60, comprised in the train of actuating devices for the ribbon carrier, as shown in Fig. 1 and various other views. The horizontally disposed arm of the bell crank 60 projects forward through the slot 59 and is provided with an open mouthed slot-way 61 which engages with the shank of a screw 62 on the stem of the ribbon carrier. Said bell crank is thus pivotally connected with said ribbon carrier and provides a support therefor. The construction of the fulcrum of the bell crank 60 is best shown in Fig. 13 which is a horizontal sectional view taken centrally of the tabs 57. Said fulcrum comprises a collar 63 having a flange 64. The bell crank 60 bears on the collar at the left of the flange 64 and to the left of the bearing portion said collar is reduced to receive a second collar or sleeve 65 having a flange 66. The outer end portions of the collars engage in the slots 58. The end portions of the bore 67 of the collar 63 are threaded to engage the shanks of headed screws 68. The screws maintain the collars 63 and 65 in fixed relationship and are also adapted to maintain the fulcrum device as a whole in set position on the ears 57. It will be understood that the flanges 64 and 66 coöperate with the sides of the bell crank 60 to prevent lateral displacement thereof while permitting said bell crank to swing freely on its fulcrum. The downwardly extending arm of the bell crank 60 is pivotally connected at 69 with the forward end of a horizontally disposed link 70, the rear end of said link being pivotally connected at 71 with a lever 72 hereinafter referred to as the operating lever. Said operating lever extends downward and forward from the pivot 71 and is fulcrumed between its ends as presently to be described. The lower arm of said operating lever is formed with an open mouthed slot 73 which as shown in Figs. 1, 20 and other views, coöperates with a headed pivot pin 74 on the arm 24, thus connecting the operating lever and the rest of the train of actuating devices with the universal bar 28 so as to receive actuations from said universal bar when it is operated by the key levers.

The means for supporting the operating lever 72 comprises a bracket which is shown detached in Fig. 18 and is also clearly illustrated in Figs. 1, 10, 11 and other views. Said bracket comprises two vertically disposed parallel side plates 75 spaced a short distance apart and connected at the top by a web 76. The plates 75 terminate forwardly in out-turned ears 77 which are secured against the rear face of the stationary segment 6 by headed screws 78. The operating lever 72 is arranged between the rear portions of the plates 75 back of the web 76, while the stem of the ribbon carrier passes between said plates forward of said web. Said operating lever is formed with an oblong opening 79 through which passes a fulcrum device which engages in holes 80 in the plates 75 of the supporting bracket. Said fulcrum device which is shown detached in Fig. 16 and also appears in Figs. 1, 5, 11 and other views, comprises a hollow headed screw 81 and a coöperating headed screw 82, the shank of which screws into the hollow shank of the screw 81 until the head of the screw 82 abuts against the end of said hollow shank, which is somewhat longer than the distance between the outer faces of the plates 75. The fulcrum device has a fixed axis and provides a fulcrum having an unvarying position, or in other words, a fixed fulcrum.

It will be noted that the upper end portion of the opening 79 is adapted to coöperate with the fixed fulcrum. The fixed fulcrum device further provides a support for a movable fulcrum device which is shown detached in Fig. 19. The movable fulcrum device comprises an angular member or lever 83 which is formed with a hole 84 through which the fixed fulcrum passes, said member 83 being arranged on the fixed fulcrum device between the plates 75, and at the right of the operating lever 72. One arm of the member 83 projects downward from the fixed fulcrum and is provided at its lower end with a laterally extending fulcrum pin 85 hereinafter referred to as the movable fulcrum. The fulcrum pin 85 projects leftward through the opening 79 in the operating lever and is adapted to coöperate with the lower end portion of the boundary of the opening 79. The member or device 83 also has a portion extending rearward from the fixed fulcrum, said rearward portion being formed with a slot 86. The portions of the member leading into the slot 86 are cut away as indicated at 87 to provide a wide flaring mouth or entranceway. The outer faces of the member 83 above and below the edges 87 are formed with contact surfaces designated respectively as 88 and 89. Said contact surfaces are adapted to coöperate, in a manner presently to be described, with lugs 90 and 91 projecting leftward from a positioning member or plate 92 shown detached in Fig. 17. As appears from Fig. 11 the positioning member is secured to the outer face of the righthand plate 75. The plate 92 is formed with a key-hole slot 93 which receives the shank of the screw 81, the plate 92 being confined between the head of said screw and the outer face of the adjacent plate 75. Near its forward end the plate 92 is formed with an arcuate slot 94 which is connected near its lower end by a cross slot 95 with a short upwardly extending slot 96. A headed shoulder screw 97 is adapted to pass through the slots at the forward end of the plate 92, said screw being secured in the adjacent plate 75 and serving together with the screw 81 to slidably support the plate 92 against said plate 75.

The positioning plate 92 is adapted to be controlled by manually operated devices comprising a link 98 pivotally connected at 99 with said plate and extending downward therefrom (Figs. 1 and 10). The lower end of the link 98 is pivotally connected at 100 with an arm 101 projecting rearward from a U-shaped frame 102, said frame being pivoted on the rod 35 and being confined between collars 103 fixed to said rod by set screws 104. Projecting forward from the right-hand portion of the frame 102 is an arm 105 terminating in a key or finger piece 106. A coiled spring 107 is secured at one end to the arm 105 and at the other end to a pin 108 on the adjacent corner post 2. The spring 107 acts on the frame 102 to give a constant downward pull on the arm 101, said pull being transmitted to the forward end of the positioning plate 92. By pressing down on the key 106 the frame 102 may be swung on its pivot 35 against the spring 107, and locked in abnormal position by swinging the arm 105 laterally outward into a cut-out 109 in the adjacent side post 2.

Returning now to the positioning plate 92, it will be seen from Fig. 1 and various other views that the rear end portion of said plate is formed with an arcuate slot 110 which is engaged by a pin 111 extending laterally from the lower end portion of a vertically disposed arm or strap 112.

Referring to Fig. 9 it will be observed that the pin 111 is provided with a flange 113 and extends beyond said flange into an elongated slot 114 in the strap 112. A headed screw 115 screws into the end of the pin 111 from the opposite side of the strap and coöperates with the flange 113 to clamp the pin 111 to the strap after said pin has been properly adjusted along the slot 114. The strap 112 extends upward and its upper end portion is enlarged and formed with an eye which engages an eccentric face 116 on an eccentric member which further comprises a hub 117 and a reduced seat 118. The eccentric member is formed with an opening which receives the ribbon driving shaft 41, the face 116 being eccentric to the axis of said shaft. A set screw 119 passes through the hub 117 and abuts against the driving shaft 41, thus securing the eccentric member in fixed relationship therewith. An annulus 120 is driven on the seat 118 and serves to confine the strap 112 to the eccentric face 116.

It will be understood that during the turning movements of the ribbon driving shaft 41 the eccentric member will be revolved and the face 116 will coöperate with the strap 112 to raise and lower the same, thereby raising and lowering the pin or actuating device 11. This actuating device is adapted to be connected, by the devices heretofore described and in a manner presently to be explained at length, with the movable fulcrum so as to cause the same to co-act variably with the operating lever 72. Said pin or eccentric device is also adapted to be disconnected from said movable fulcrum so as to enable said movable fulcrum to be manually set by the devices including the key 106 in one or another of a plurality of predetermined positions so as to enable predetermined extents of the movement to be communicated to the ribbon carrier at pleasure.

When a two-color ribbon is employed, such as the ribbon 44 shown in Fig. 1, the automatic devices for moving the ribbon crosswise are preferably disconnected. In Fig. 1 the automatic devices are inoperative and the parts are shown in normal position and adjusted so as to present the upper ribbon field $a$ to the types when actuated. The operated positions of the parts corresponding to the Fig. 1 position are shown in Fig. 4.

Referring to Figs. 1 and 4 it will be observed that the plate 92 is pushed rearward so that the pin 111 is not engaged with the slot 86 and that the devices controlled by the finger key 106 are set so as to maintain the upper end of the slot 94 down in engagement with the screw 97. By reason of this setting of the plate 92 the lug 91 thereon engages the contact surface 89 on the movable fulcrum device and maintains the movable fulcrum 85 in the position shown in Fig. 1 near the forward edge of the opening 79. If now with the parts set as in Fig. 1, one of the printing key levers 10 be operated the universal bar 28 will be depressed, rocking the shaft 25 and swinging the arm 24 downward, thereby causing the pin 74 on said arm to act against the lower arm of the operating levers 72 and swing the said arm rearward, the upper arm of said lever at the same time swinging forward and operating through the link 70 and bell crank 60 to lift the ribbon carrier and ribbon from normal to printing position. During this operation the operating lever 72 will coöperate exclusively with the fixed fulcrum device 81, 82 and will not operatively engage with the movable fulcrum device 85. The reason for this will be understood from a consideration of Figs. 1 and 4 from which it will be noted that the width of the opening 79 is such that when the movable fulcrum 85 is set as shown in Fig. 1 there must be a considerable rearward motion of the lower arm of the operating lever prior to the contacting of the forward edge of the opening 79 with the movable fulcrum 85. In Fig. 4 it will be seen that the upper ribbon field $a$ will be brought to operative position opposite the printing point on the platen before the lost motion is entirely taken up. The operated type will, of course, print through the ribbon field $a$ and concurrently the carriage feeding or escapement devices will coöperate in the usual manner. When the printing key is released the parts will be restored to normal position by the aid of gravity and certain restoring springs, said restoring springs including a coiled spring 121 connected at one end to a pin 122 on the arm 24 and at the other end to a pin 123 on the left-hand plate 75. During the operating movement of the lever 72 it will be maintained in engagement with the fixed fulcrum by a lug 124 projecting laterally leftward from the upper edge of the plate 92 through a cut-out 125 in the right-hand plate 75 and into the path of the front edge portion of said operating lever. Said front edge portion where it coöperates with the lug 124 is curved as indicated at 126 concentric with the fixed fulcrum so that while swinging movements of the operating lever will not be impeded, nevertheless said lever will be prevented from separating from the fixed fulcrum. During the up and down movements of the ribbon carrier the stem 49 thereof will be maintained contiguous to the rear face of the segment 6 by a cross pin 127 connecting the plate 75. It will be understood that so long as the parts are set normally as shown in Fig. 1 the ribbon carrier will receive an unvarying extent of movement or throw at printing operation so that the type will follow a straight path longitudinal of the field $a$, said path being represented by the dotted line $x$ in Fig. 3.

Suppose that it be desired to make use of the lower ribbon field $b$, then the finger key 106 is depressed and the arm 105 swung rightward into the cut-out 109, thereby locking said arm in depressed position. The downward movement of the arm 105 operates through the frame 102, arm 101 and link 98 to swing the positioning plate 92 from the position shown in Figs. 1 and 4 to that shown in Fig. 5. During the movement of the plate 92 it will pivot on the fulcrum device 81, 82 as a center, said fulcrum device coöperating during the swing with the sides of the slot 93. At the same time the sides of the arcuate slot-way 94 slide over the screw 97. As a result of this swinging movement of the positioning plate 92 the lug 91 thereon will move downward away from the contact face 89 on the movable fulcrum device and the lug 90 will engage with the contact face 88 and will swing the movable fulcrum device on its pivot, moving the movable fulcrum 85 forward. The result will be that when the arm 101 is locked down, the movable fulcrum 85 will be set in a new position in front of the Fig. 4 position. During this resetting of the movable fulcrum there will be no movement of the operating lever nor of the train of actuating devices of which it is a part. In the new normal position of the movable fulcrum it will be observed that it is in contact with the front face of the slot 79. The result will be that when any of the printing keys is operated the lower arm of the lever 72 will swing rearward, fulcruming on the fulcrum pin 85 while the upper arm of the lever 72 will swing forward, causing the front edge of the opening 79 to separate from the fixed fulcrum device. A cross pin 128 supported on the plates 75 will contact during this swinging movement of the lever 72 with an edge 129 on said lever which is concentric with the fulcrum pin 85 and said pin 128 will operate to maintain the lever 72 engaged with the fulcrum pin 85 throughout the swing of said lever. As a result of this change of fulcrums the power arm of the operating lever will be shortened while its load arm will be lengthened and consequently the throw or extent of movement of the ribbon carrier will be increased. The parts are so proportioned and adjusted that the increased throw of the ribbon carrier will bring the lower ribbon field $b$ opposite the printing point on the platen. The operated position of the parts at this time is illustrated in Fig. 6. It will be understood from Figs. 5 and 6 from what has been said that during the operation of the parts the operating lever fulcrums exclusively on the fulcrum pin 85 and that the fixed fulcrum device does not at this time serve as a fulcrum at any stage in the operation. As long as the fulcrum pin 85 is set in the normal position shown in Fig. 5 the throw communicated to the ribbon carrier at printing operation will not vary and the lower ribbon field $b$ will always be presented to the types, causing the types to follow a path lengthwise of the field $b$, said path being represented by the dotted line $y$ in Fig. 3 from which it will be noted that the path $y$ is parallel with the path $x$.

It will be understood that during the vibratory movements of the ribbon carrier and its train of actuating devices for either the upper field $a$ or the lower field $b$ of the ribbon 44 that the ribbon will be fed longitudinally and the guiding shaft 41 will rotate, causing the raising and lowering of the strap or arm 112 and the consequent up and down movement of the pin 111 in the slot 110. The movement of the pin 111 at this time, however, is an idle one and will not affect any of the other parts.

Suppose that the two-color ribbon 44 be replaced by a plain or uniform ribbon such as that shown in Figs. 3, 7 and 15, said plain ribbon being designated as 130. When such a ribbon as 130 is employed it will ordinarily be desired to feed it automatically crosswise as well as lengthwise so as to exhaust it uniformly. In order to bring the crosswise feeding devices into play the arm 101 is released from the cut-out 109 and is permitted to be drawn upward by the spring 107, causing the forward end portion of the plate 92 to swing downward. As soon as the operator observes that the cross slot 95 is opposite the shank of the screw 97 he presses the plate 92 forward, causing the sides of the slot 95 to slide along the screw 97 until the rear end of the slot is reached. Thereupon the forward end of the plate 92 is again pressed downward, causing the seating of the shank of the screw 97 in the upper end of the slot 96. The construction is such that by this operation the plate 92 is securely locked in the position shown in Fig. 7. The adjustment of the plate in the manner last described may be accomplished either by reaching in behind and pushing on the plate itself or by manipulating the end of the pin 111. This pin as will be apparent from Fig. 11 is rather long and affords a convenient means for adjusting the plate 92, since, by reason of its engagement with the slot 114, forward or backward movements will be communicated through the pin to the plate. It will be understood that when the plate 92 is pushed forward the pin 111 will move forward also, the arm or strap 112 swinging to permit of this; and that said pin 111 will be guided by the flaring mouth 87 into the slot 86 in the movable fulcrum device 83 and caused to engage in said slot, thus connecting the eccentric strap with the movable fulcrum device. The setting of the plate 92 by the engagement of the screw 97 with the top of the slot 96 fixes the position of the slot 114 with the result that the up and down movements of the pin 111, due to the action of the eccentric 116 on the strap 112, will be restricted by the sides of the slot 114 to an unvarying path up and down along said slot. The slot serves to maintain the pin 111 in engagement with the slot 86 with the result that the up and down movements of said pin will be transmitted to the movable fulcrum device, causing vibrations of said fulcrum device on its pivotal center 81, 82. The vibrations of the movable fulcrum, of course, result in vibrations of the fulcrum pin 85, causing a slight variation in the position of said pin at each printing operation, said vibration in position being automatically effected. It will be understood that the limits of automatic movement of the fulcrum pin 85 correspond with the set positions of said fulcrum pin as shown in Figs. 1 and 5 and that between these limits the fulcrum pin will occupy during the operation of the machine a large number of positions, said fulcrum pin moving progressively or step-by-step from one of its limits to the other and then back again during printing operations.

One of the extreme positions of the fulcrum pin 85 when it is being automatically controlled is shown in Fig. 7 and another and extreme position is shown in Fig. 8. It will be understood that when the pin 85 is in the Fig. 7 position an actuation of the parts will cause the ribbon to be raised to its highest point, and that an actuation of the parts from the Fig. 8 position will cause the ribbon to be raised to its least extent. When the fulcrum pin 85 occupies a position intermediate the two extreme positions the ribbon carrier will be thrown to a corresponding intermediate position. In Fig. 7 the fulcrum pin 85 alone is operative to the exclusion of the fixed fulcrum. As the fulcrum pin 85 is moved progressively forward from the Fig. 7 position the operating lever will fulcrum first on the fixed fulcrum and later in the course of its movement will fulcrum on the pin 85. At first it will be understood that it will fulcrum on the fixed fulcrum only during a very short time at the beginning of its swing, soon being brought against the fulcrum pin 85 and thereafter leaving the fixed fulcrum and fulcruming on the pin 85. As, however, the progressive step-by-step movements of the fulcrum pin 85 bring it closer to the Fig. 8 position, the extent of swing of the operating lever on the fixed fulcrum will increase and its extent of swing on the movable fulcrum 85 will correspondingly diminish, until finally when the Fig. 8 position is reached the swing is exclusively on the fixed fulcrum. Thereafter as the fulcrum pin 85 is moved step-by-step back from the Fig. 8 to the Fig. 7 position the operations above outlined will take place in reverse order. From what has been said it will be apparent that by reason of the automatic and progressive to-and-fro movements of the movable fulcrum pin and the consequent variation in the extent of throw of the operating lever that the paths followed by the types on the ribbon 130 will be sinuous or wavy, extending lengthwise of the ribbon and curving from side to side thereof as illustrated by the dotted line z in Fig. 2.

In the outline of the operation of the present invention as above set forth no mention has been made of the shifting of the platen, and the series of operations has been described without reference to the platen shift. The platen is shifted by depressing one of the keys 36, thereby elevating the shifting frame comprising the rods 30 and 31 and causing the platen to move upward from the dotted line to the full line position shown in Fig. 15. The brackets 50 and 54 are rigid on the platen shifting frame and the bell crank 60 is fulcrumed on the bracket 54 and supports the ribbon carrier so that when the platen is shifted the ribbon carrier and the bell crank 60 will also be shifted bodily from the Fig. 1 position to the Fig. 15 position. Because of the shifting of the bell crank 60 the link 70 will be swung upward from the dotted line position in Fig. 15 to the full line position in said figure, this swing of the link taking place on the pivot 71 as a center but without altering the position of said pivot or of the operating lever 72 or other parts. It will be apparent therefore that when the platen is shifted the ribbon carrier is shifted so that its relationship with the platen is not altered, and that this shifting of the ribbon carrier does not affect the operating lever 72 or the controlling devices therefor so that the action of said operating lever and its effect on the ribbon carrier will not in any way be changed by the shifting of the platen.

It will be observed that by my present invention I combine with a vibratory ribbon carrier, an operating lever provided with two fulcrums, and means for varying the relationship between said two fulcrums; that said means may be automatically controlled or may be hand-controlled at pleasure; that means are provided for moving one of said fulcrums relatively to the lever independently of said other fulcrum; that means are provided for changing the normal relationship between said fulcrums; that automatic means are provided for moving one of said fulcrums; that means are provided for automatically changing the normal relationship between the operating lever and a fulcrum coöperative therewith; that a plurality of fulcrums are provided which coöperate with said lever associated with means for automatically moving certain of said fulcrums; that means are provided for changing the position of a fulcrum so as to vary the point at which the lever coöperates with said fulcrum during the course of the actuating movement of said lever; that means are provided which operate automatically to render a fulcrum inoperative, said means also rendering said fulcrum operative; that a lever for actuating the ribbon carrier is combined with two fulcrums and means for automatically and progressively moving one of said fulcrums while the other remains motionless; that the lever may coöperate with both said fulcrums during an actuating movement of said lever; that as a result of the changing position of one of said fulcrums the point at which said lever changes from one fulcrum to the other is automatically varied; that the train of actuating devices for the vibratory ribbon carrier includes a lever which is combined with means for automatically varying the lengths of the power and load arms of said lever; that such automatic variation may take place during an actuating stroke of said lever; that a pivoted device is provided which device carries a fulcrum pin engaging with the operating lever, said operating lever being provided with an opening which said fulcrum pin enters and in which it remains at all times;

that the means for feeding the ribbon longitudinally includes a driving shaft; that connections are provided between said driving shaft and said pivoted device; that said connections comprise an eccentric device secured to said driving shaft and a coöperating strap; that said strap carries a pin which engages with a slot in said pivoted device; that means are provided for disconnecting said pin from said slot, said means comprising a slidable plate, said plate having a slot engaging said pin; that said plate is also provided with lugs engageable alternately with said device; that said plate may be turned as on a pivot to bring one or another of said lugs into operation and position said device; and that when said device is so positioned the connections between it and said driving shaft are inoperative.

Various changes may be made without departing from the spirit and scope of my invention.

What I claim as new and desire to secure by Letters Patent, is:—

1. In ribbon mechanism for typewriting machines, the combination of a vibratory ribbon carrier, means for actuating the same comprising a lever, two fulcrums for said lever, and means for varying the relationship between said two fulcrums.

2. In ribbon mechanism for typewriting machines, the combination of a vibratory ribbon carrier, means for actuating said carrier comprising a lever, a pair of fulcrums for said lever, and means for automatically varying the relationship between said fulcrums.

3. In ribbon mechanism for typewriting machines, the combination of a vibratory ribbon carrier, means for actuating said carrier comprising a lever, a pair of fulcrums for said lever, and hand controlled means for varying the relationship between said fulcrums.

4. In ribbon mechanism for typewriting machines, the combination of a vibratory ribbon carrier, means for actuating said carrier comprising a lever, a pair of fulcrums for said lever, and means operative either automatically or by hand at pleasure for varying the relationship between said fulcrums.

5. In ribbon mechanism for typewriting machines, the combination of a vibratory ribbon carrier, means for actuating said carrier including a lever, two fulcrums therefor, and means for moving one of said fulcrums relatively to the lever independently of said other fulcrum.

6. In ribbon mechanism for typewriting machines, the combination of a vibratory ribbon carrier, means for actuating said carrier including a lever, a plurality of fulcrums therefor, and means for changing the normal relationship between said fulcrums.

7. In ribbon mechanism for typewriting machines, the combination of a vibratory ribbon carrier, means for actuating the same including a lever, a fulcrum for said lever, and means for automatically moving said fulcrums.

8. In ribbon mechanism for typewriting machines, the combination of a vibratory ribbon carrier, means for actuating the same including a lever, a fulcrum for said lever, and means for automatically changing the normal relationship between said lever and said fulcrum.

9. In ribbon mechanism for typewriting machines, the combination of a vibratory ribbon carrier, actuating means therefor including a lever, a plurality of fulcrums coöperative with said lever, and means for automatically moving certain of said fulcrums.

10. In ribbon mechanism for typewriting machines, the combination of a vibratory ribbon carrier, actuating means therefor including a lever, a plurality of fulcrums coöperative with said lever, and means for changing the normal relationship between certain of said fulcrums.

11. In ribbon mechanism for typewriting machines, the combination of a vibratory ribbon carrier, actuating means therefor including a lever, a fulcrum for said lever, and means for changing the position of said fulcrum so as to vary the point at which said lever coöperates with said fulcrum during the course of the actuating movement of said lever.

12. In ribbon mechanism for typewriting machines, the combination of a vibratory ribbon carrier, actuating devices for said carrier including a lever, a plurality of fulcrums for said lever, and means for automatically and progressively varying the normal position of certain of said fulcrums.

13. In ribbon mechanism for typewriting machines, the combination of a vibratory ribbon carrier, actuating devices for said carrier including a lever, a fulcrum for said lever, and means for automatically and progressively varying the normal position of said fulcrum.

14. In ribbon mechanism for typewriting machines, the combination of a vibratory ribbon carrier, means for actuating the same including a lever, a fulcrum for said lever, and means operative automatically to render said fulcrum inoperative.

15. In ribbon mechanism for typewriting machines, the combination of a vibratory ribbon carrier, means for actuating the same including a lever, a fulcrum for said lever, and means operative automatically to render said fulcrum operative and inoperative.

16. In ribbon mechanism for typewriting machines, the combination of a vibratory ribbon carrier, actuating means therefor including a lever, two fulcrums for said lever, and means for automatically and progressively moving one of said fulcrums while the other fulcrum remains motionless.

17. In ribbon mechanism for typewriting machines, the combination of a vibratory ribbon carrier, actuating means therefor including a lever, two fulcrums for said lever one of said fulcrums being operative during one portion of the actuating movement of said lever and the other of said fulcrums being operative during another portion of the same actuating movement of said lever.

18. In ribbon mechanism for typewriting machines, the combination of a vibratory ribbon carrier, actuating means therefor including a lever, two fulcrums for said lever, one of said fulcrums being operative during one portion of the actuating movement of said lever, and the other of said fulcrums being operative during another portion of the same actuating movements of said lever, and means for changing the points at which said lever co-acts with said fulcrums.

19. In ribbon mechanism for typewriting machines, the combination of a vibratory ribbon carrier, actuating means therefor including a lever, two fulcrums for said lever, said lever changing from one fulcrum to the other during a single actuating movement, and means for automatically varying the point at which said lever changes from one fulcrum to the other.

20. In ribbon mechanism for typewriting machines, the combination of a vibratory ribbon carrier, actuating means therefor including a lever, two fulcrums for said lever, said lever changing from one fulcrum to the other during a single actuating movement, and means for automatically moving one of said fulcrums and thereby varying the point at which said lever changes from one fulcrum to the other.

21. In ribbon mechanism for typewriting machines, the combination of a vibratory ribbon carrier, actuating means for said carrier including a lever, a fulcrum for said lever, means for feeding the ribbon longitudinally including a driving shaft, and connections between said driving shaft and said fulcrum.

22. In ribbon mechanism for typewriting machines, the combination of a vibratory ribbon carrier, actuating means for said carrier including a lever, a fulcrum for said lever, means for feeding the ribbon longitudinally including a driving shaft, connections between said driving shaft and said fulcrum, and means for disconnecting said connections.

23. In ribbon mechanism for typewriting machines, the combination of a vibratory ribbon carrier, actuating means for said carrier including a lever, a fulcrum for said lever, means for feeding the ribbon longitudinally including a driving shaft, and connections between said driving shaft and said fulcrum, said connections including an eccentric connected to said shaft and a strap coöperative with said eccentric.

24. In ribbon mechanism for typewriting machines, the combination of a vibratory ribbon carrier, a train of actuating devices therefor including a lever, and means for automatically varying the lengths of the power and load arms of said lever.

25. In ribbon mechanism for typewriting machines, the combination of a vibratory ribbon carrier, a train of actuating devices therefor including a lever, and means for automatically varying the lengths of the power and load arms of said lever during an actuating stroke of said lever.

26. In ribbon mechanism for typewriting machines, the combination of a vibratory ribbon carrier, actuating means for said carrier including a lever, a pivoted device carrying a fulcrum coöperative with said lever, and automatic means for moving said device on its pivot.

27. In ribbon mechanism for typewriting machines, the combination of a vibratory ribbon carrier, actuating means for said carrier including a lever, a pivoted device carrying a fulcrum coöperative with said lever, and means for turning said device and thereby communicating rotary movements around said pivot to said fulcrum.

28. In ribbon mechanism for typewriting machines, the combination of a vibratory ribbon carrier, actuating means for said carrier including a lever, a pivoted device carrying a fulcrum coöperative with said lever, means for feeding the ribbon longitudinally including a driving shaft, and connections between said driving shaft and said pivoted device.

29. In ribbon mechanism for typewriting machines, the combination of a vibratory ribbon carrier, actuating means for said carrier including a lever, a pivoted device carrying a fulcrum coöperative with said lever, means for feeding the ribbon longitudinally including a driving shaft, and connections between said driving shaft and said pivoted device, said connections including an eccentric fixed on said shaft and a strap coöperative with said eccentric and pivotally connected with said device.

30. In ribbon mechanism for typewriting machines, the combination of a vibratory ribbon carrier, actuating means for said carrier including a lever, a pivoted device carrying a fulcrum coöperative with said lever, means for feeding the ribbon longitudinally including a driving shaft, connections between said driving shaft and said pivoted device, said connections including an eccentric fixed on said shaft and a strap coöperative with said eccentric and pivotally connected with said device, and hand-controlled means for disconnecting said strap from said device.

31. In ribbon mechanism for typewriting machines, the combination of a vibratory ribbon carrier, actuating means for said carrier including a lever formed with an opening between its ends, a pivoted device carrying a fulcrum pin which is at all times maintained in said opening, and means for turning said device on its pivot and varying the normal position of said fulcrum pin in said opening.

32. In ribbon mechanism for typewriting machines, the combination of a vibratory ribbon carrier, actuating means for said carrier including a lever formed with an opening between its ends, a fixed fulcrum engaging said opening, a movable fulcrum arranged in said opening, and means for varying the position of said movable fulcrum in said opening.

33. In ribbon mechanism for typewriting machines, the combination of a vibratory ribbon carrier, actuating means for said carrier including a lever formed with an opening between its ends, a fixed fulcrum engaging said opening, a pivoted device carrying a fulcrum pin entering said opening, and means for turning said device on its pivot to vary the normal position of said fulcrum pin in said opening.

34. In ribbon mechanism for typewriting machines, the combination of a vibratory ribbon carrier, actuating means for said carrier including a lever, a pivoted device carrying a fulcrum pin coöperative with said lever, means for feeding the ribbon longitudinally including a driving shaft, an eccentric on said driving shaft, a coöperating strap, and a pin and slot connection between said strap and said device.

35. In ribbon mechanism for typewriting machines, the combination of a vibratory ribbon carrier, actuating means therefor including a lever, a fulcrum for said lever, and a hand-controlled positioning plate operative on said fulcrum to change the position thereof and vary the point at which said lever coöperates with said fulcrum.

36. In ribbon mechanism for typewriting machines, the combination of a vibratory ribbon carrier, actuating means therefor including a lever, a fulcrum for said lever, and a pivotally supported plate provided with devices alternately coöperative with said fulcrum to change the position thereof.

37. In ribbon mechanism for typewriting machines, the combination of a vibratory ribbon carrier, actuating means therefor including a lever, a fulcrum for said lever, a pivotally supported plate provided with devices alternately coöperative with said fulcrum to change the position thereof, and hand controlled means for moving said plate and maintaining it in one or another of a plurality of predetermined positions.

38. In ribbon mechanism for typewriting machines, the combination of a vibratory ribbon carrier, actuating means therefor including a lever, a fulcrum for said lever, a pivotally supported plate provided with devices alternately coöperative with said fulcrum to change the position thereof, and hand controlled means for moving said plate and maintaining it in one or another of a plurality of predetermined positions, said hand controlled means comprising a pivotally supported frame having an arm connected with said plate, said frame being further provided with a second arm having a finger piece and engageable with a fixed detent.

39. In ribbon mechanism for typewriting machines, the combination of a vibratory ribbon carrier, actuating means therefor including a lever, a fulcrum for said lever, a pivotally supported plate provided with devices alternately coöperative with said fulcrum to change the position thereof, hand controlled means for moving said plate and maintaining it in one or another of a plurality of predetermined positions, said hand controlled means comprising a pivoted frame pivotally connected with said plate, and a spring connected with said frame and tending constantly to turn it in one direction.

40. In ribbon mechanism for typewriting machines, the combination of a vibratory ribbon carrier, actuating means therefor including a lever, a pivoted device carrying a fulcrum pin engaging with said lever, and a hand controlled plate provided with lugs engageable alternately with said device to turn it on its pivot and maintain it set in one or another of a plurality of predetermined positions.

41. In ribbon mechanism for typewriting machines, the combination of a vibratory ribbon carrier, actuating means for said carrier including a lever, a fulcrum for said lever, means for feeding the ribbon longitudinally including a driving shaft, connections between said driving shaft and said fulcrum, and a hand controlled slidable plate operative to disconnect said connections.

42. In ribbon mechanism for typewriting machines, the combination of a vibratory ribbon carrier, actuating means for said carrier including a lever, a fulcrum for said lever, means for feeding the ribbon longitudinally including a driving shaft, connections between said driving shaft and said fulcrum including an eccentric strap provided with a projecting actuating pin, and a hand controlled slidable plate having a slot with which said pin engages, said plate being settable to disconnect and connect said connections.

43. In ribbon mechanism for typewriting machines, the combination of a vibratory ribbon carrier, actuating means for said carrier including a lever, a pivoted device carrying a fulcrum pin at one side of its pivot and provided with a slot at the other side, means for feeding the ribbon longitudinally including a driving shaft, an eccentric on said shaft, a coöperating eccentric strap carrying a pin, and a hand controlled slotted plate engaging said pin and movable to connect and disconnect said pin from the slot in said device.

44. In a typewriting machine, the combination of a platen, means for shifting the same, a ribbon carrier connected with said shifting means, means for actuating said carrier including a lever, a fulcrum for said lever, and means for automatically changing the normal relationship between said lever and said fulcrum, said lever remaining quiescent during shifting movements of the platen.

45. In a typewriting machine, the combination of a platen, means for shifting the same, a ribbon carrier connected with said shifting means, means for actuating said carrier including a lever, a fulcrum for said lever, and means for automatically moving said fulcrum, said lever remaining quiescent during shifting movements of the platen.

46. In a typewriting machine, the combination of a platen, means for shifting the same, a ribbon carrier connected with said shifting means, means for actuating said carrier including a lever, a fulcrum for said lever, and means controllable either automatically or by hand at pleasure for moving said fulcrum, said means being independent of said platen shifting means.

47. In a typewriting machine, the combination of a platen, platen shifting means, a vibratory ribbon carrier, a lever connected therewith and with said shifting means, an operating lever, a link connecting said lever with said operating lever, a fulcrum for said operating lever, means for moving said fulcrum to vary its normal relationship with said operating lever, a key controlled universal bar, and connections between said universal bar and said operating lever.

48. In a typewriting machine, the combination of a platen, a platen shifting frame, a ribbon carrier, a lever pivoted on said frame and connected with said carrier, an operating lever, a link connecting said operating lever with said first named lever, a fulcrum, means for moving said fulcrum to change its normal operative relationship with said operating lever, a key controlled universal bar, and connections between said universal bar and said operating lever.

Signed at the borough of Manhattan, city of New York, in the county of New York, and State of New York, this 1st day of July A. D. 1909.

ANDREW W. STEIGER.

Witnesses:
M. F. HANNWEBER,
CHARLES E. SMITH.